(12) United States Patent
Son

(10) Patent No.: US 8,909,155 B2
(45) Date of Patent: Dec. 9, 2014

(54) METHOD OF ANALYZING INTERFERENCE BETWEEN HETEROGENEOUS WIRELESS COMMUNICATION SYSTEMS

(71) Applicant: Electronics and Telecommunications Research Institute, Daejeon (KR)

(72) Inventor: Ho Kyung Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 79 days.

(21) Appl. No.: 13/774,064

(22) Filed: Feb. 22, 2013

(65) Prior Publication Data

US 2013/0244582 A1    Sep. 19, 2013

(30) Foreign Application Priority Data

Mar. 19, 2012    (KR) .................. 10-2012-0027982

(51) Int. Cl.
*H04W 24/00* (2009.01)
*H04W 24/08* (2009.01)
*H04W 16/14* (2009.01)

(52) U.S. Cl.
CPC .............. *H04W 24/00* (2013.01); *H04W 16/14* (2013.01); *H04W 24/08* (2013.01)
USPC ...................................... 455/63.1; 455/67.13

(58) Field of Classification Search
USPC .............. 455/41.1, 422.1, 63.1, 67.11, 67.13, 455/67.14, 101, 115.1, 226.1; 375/267, 375/295, 296
See application file for complete search history.

(56) References Cited

U.S. PATENT DOCUMENTS

| 8,412,109 | B2* | 4/2013 | Voutilainen et al. | ........ 455/67.13 |
| 8,768,248 | B2* | 7/2014 | Sadr | .............................. 455/41.1 |
| 2011/0261894 | A1* | 10/2011 | Yu et al. | ......................... 375/296 |
| 2013/0072125 | A1* | 3/2013 | Yoon et al. | ................ 455/67.11 |

FOREIGN PATENT DOCUMENTS

KR    1020100053640 A    5/2010

* cited by examiner

*Primary Examiner* — Thanh Le
(74) *Attorney, Agent, or Firm* — Ladas & Parry LLP

(57) ABSTRACT

The present invention relates to a method of analyzing interference between heterogeneous wireless communication systems, including receiving, by an interference analysis unit, interference parameters from a parameter input unit; receiving, by the interference analysis unit, polarized information from a polarized information input unit and calculating a Polarized Mismatch Loss Factor (PMLF) between a transmission antenna of an interference transmitter and a reception antenna of a victim receiver; and analyzing, by the interference analysis unit, an interference influence of the interference transmitter on the victim receiver based on the interference parameters and the PMLF. In accordance with the present invention, an interference influence between heterogeneous wireless communication systems using different polarized waves can be precisely analyzed by incorporating a loss characteristic according to a polarized mismatch between transmission and reception antennas into the interference influence.

14 Claims, 4 Drawing Sheets

METHOD OF ANALYZING INTERFERENCE BETWEEN HETEROGENEOUS WIRELESS COMMUNICATION SYSTEMS

CROSS-REFERENCES TO RELATED APPLICATIONS

The present application claims priority under 35 U.S.C 119(a) to Korean Application No. 10-2012-0027982, filed on Mar. 19, 2012, in the Korean Intellectual Property Office, which is incorporated herein by reference in its entirety set forth in full.

BACKGROUND

Exemplary embodiments of the present invention relate to a method of analyzing interference between heterogeneous wireless communication systems, and more particularly, to a method of analyzing interference between heterogeneous wireless communication systems, which analyzes an interference influence between the heterogeneous wireless communication systems by incorporating a loss characteristic according to a polarized mismatch between transmission and reception antennas into the interference influence.

Methods chiefly used to analyze interference between wireless communication systems include a Minimum Coupling Loss (MCL) method and a Monte-Carlo method.

First, in the MCL method, the degree of isolation necessary for a plurality of wireless communication systems to be operated without mutual interference, and an isolation distance and an isolation frequency based on the degree of isolation are calculated using system parameters and a propagation model.

Interference between the wireless communication systems may be prevented by isolating the distances or frequencies between a victim receiver and an interference transmitter form each other based on the calculated isolation distance and isolation frequency.

In contrast, the Monte-Carlo method is a method of setting all parameter values related to an interference environment and then statistically calculating an interference probability. The Monte-Carlo method is a little great in complexity and different in a calculated interference probability according to an input parameter value, but is advantageous in that an interference probability into which a real environment has been incorporated may be calculated and all interference environments may be simulated.

In accordance with the MCL method and the Monte-Carlo method, however, it is difficult to precisely analyze an interference influence between wireless communication systems using different polarized waves.

A pertinent prior art includes Korean Patent Laid-Open Publication No. 10-2010-0053640 (May 20, 2010) entitled 'Adaptation of Transmit Power Based on Maximum Received Signal Strength'.

SUMMARY

An embodiment of the present invention relates to a method of analyzing interference between heterogeneous wireless communication systems, which is capable of precisely analyzing an interference influence between wireless communication systems using different polarized waves when the wireless communication systems use neighboring frequencies.

In an embodiment, a method of analyzing interference between heterogeneous wireless communication systems includes receiving, by an interference analysis unit, interference parameters from a parameter input unit; receiving, by the interference analysis unit, polarized information from a polarized information input unit and calculating a Polarized Mismatch Loss Factor (PMLF) between a transmission antenna of an interference transmitter and a reception antenna of a victim receiver; and analyzing, by the interference analysis unit, an interference influence of the interference transmitter on the victim receiver based on the interference parameters and the PMLF.

In the calculating of the PMLF of the present invention, the interference analysis unit calculates the PMLF based on an isolation angle between the transmission antenna and the reception antenna.

In the present invention, the PMLF is calculated according to Equation 1 below.

$$\text{PMLF(dB)} = 20 \log(\cos \theta) \qquad \text{(Equation 1)}$$

wherein $\theta$ is the isolation angle between the transmission antenna and the reception antenna.

In the calculating of the polarized mismatch loss of the present invention, the polarized information is polarized pattern information about the transmission antenna and the reception antenna.

In the present invention, analyzing the interference influence includes calculating, by the interference analysis unit, the intensity of an interference signal, radiated from the interference transmitter and received by the victim receiver, based on the interference parameters and the PMLF and calculating, by the interference analysis unit, calculating a degree of isolation based on the intensity of the interference signal.

The method of the present invention further includes calculating, by the interference analysis unit, a target isolation distance and a target isolation frequency between the interference transmitter and the victim receiver based on the degree of isolation.

In the calculating of the intensity of the interference signal of the present invention, the interference analysis unit calculates the intensity of the interference signal based on one or more of transmit power of the interference transmitter, gains of the transmission antenna and the reception antenna, and an isolation distance and an isolation frequency between the interference transmitter and the victim receiver.

In the present invention, analyzing the interference influence includes calculating, by the interference analysis unit, the intensity of a normal signal, radiated from a target transmitter and received by the victim receiver, based on the interference parameters and the PMLF; calculating, by the interference analysis unit, the intensity of a interference signal, radiated from the interference transmitter and received by the victim receiver, based on the interference parameters and the PMLF; and calculating, by the interference analysis unit, an interference probability based on the intensity of the normal signal and the intensity of the interference signal.

The interference parameters of the present invention include information having a form of a statistically calculated distribution value.

In the calculating of the intensity of the normal signal of the present invention, the interference analysis unit calculates the intensity of the normal signal based on one or more of transmit power of the target transmitter, a gain of a transmission antenna of the target transmitter, a gain of the reception antenna of the victim receiver, and a path loss between the target transmitter and the victim receiver.

In the calculating of the intensity of the interference signal of the present invention, the intensity of the interference signal is calculated by applying a blocking interference method.

In the calculating of the intensity of the interference signal of the present invention, the intensity of the interference signal is calculated by applying an unwanted radiation interference method.

In the calculating of the intensity of the interference signal of the present invention, the intensity of the interference signal is calculated by applying an inter-modulation interference method.

In the calculating of the interference probability of the present invention, the interference analysis unit calculates a probability that a value obtained by dividing the intensity of the normal signal by the intensity of the interference signal is a preset reference value or lower, as the interference probability.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
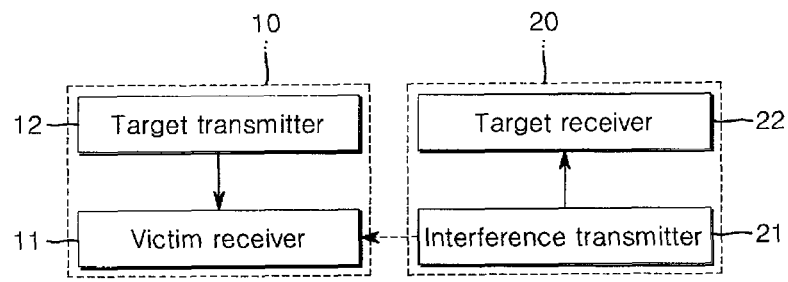
FIG. 1 is a diagram illustrating a condition in which interference is generated between common wireless communication systems.
Figure 2:
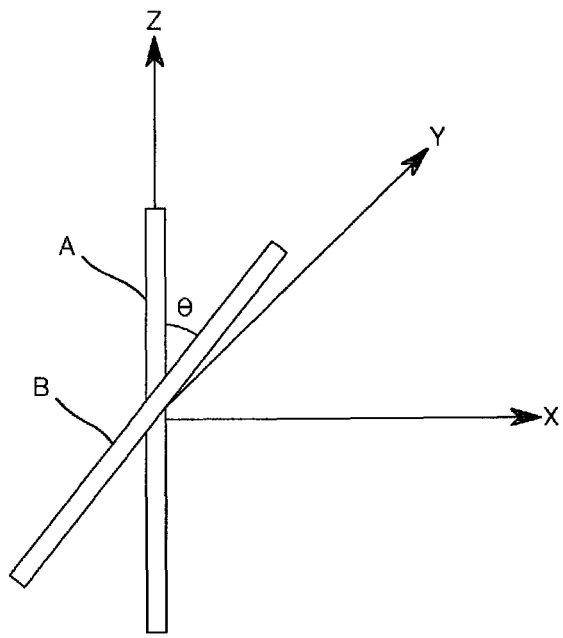
FIG. 2 is a diagram illustrating a polarized mismatch loss between a transmission antenna and a reception antenna.

FIG. 1 is a diagram illustrating a condition in which interference is generated between common wireless communication systems, and FIG. 2 is a diagram illustrating a polarized mismatch loss between a transmission antenna and a reception antenna.

Referring to FIG. 1, a system subject to interference 10, that is, the subject of interference analysis includes a victim receiver 11 and a target transmitter 12. An interfering system 20 that generates interference affecting the system subject to interference 10 includes an interference transmitter 21 and a target receiver 22.

That is, the victim receiver 11 and the target transmitter 12 form one wireless communication system, and the interference transmitter 21 and the target receiver 22 form the other wireless communication system.

Accordingly, the victim receiver 11 receives a signal from the target transmitter 12, and the interference transmitter 21 sends a signal to the target receiver 22.

Here, the signal radiated from the interference transmitter 21 may be transferred to the victim receiver 11 forming the other wireless communication system, other than the target receiver 22, with the result that an interference phenomenon may be generated.

That is, the victim receiver 11 may receive an interference signal from the interference transmitter 21 forming the other wireless communication system, together with a normal signal received from the target transmitter 12.

In this case, the intensity of the interference signal that is radiated from the interference transmitter 21 and then received by the victim receiver 11 may be determined based on an antenna gain of the interference transmitter 21, an antenna gain of the victim receiver 11, the distance between the interference transmitter 21 and the victim receiver 11, and a difference in transmission and reception frequencies.

Furthermore, as shown in FIG. 2, if the antennas of the interference transmitter 21 and the victim receiver 11 use different polarized patterns A and B, a loss due to a polarized mismatch between the polarized patterns A and B also has an effect on the intensity of the interference signal.

Accordingly, the present invention is intended to propose a method of precisely analyzing an interference influence between heterogeneous wireless communication systems by incorporating a loss characteristic according to a polarized mismatch between a transmission antenna of the interference transmitter 21, generating interference, and a reception antenna of the victim receiver 11, subject to the interference, into the interference influence.

Figure 3:
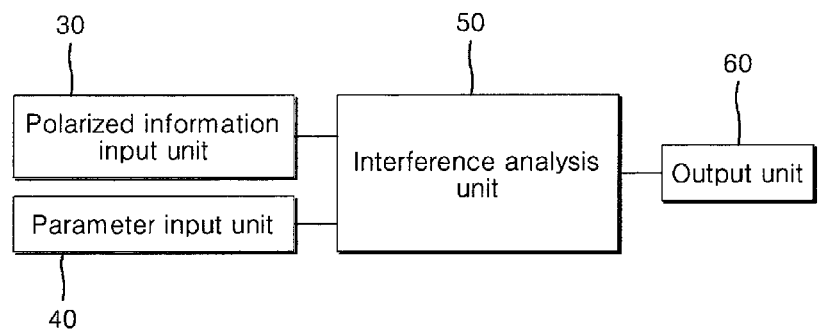
FIG. 3 is a block diagram of an apparatus for performing a method of analyzing interference between heterogeneous wireless communication systems according to an embodiment of the present invention.

FIG. 3 is a block diagram of an apparatus for performing a method of analyzing interference between heterogeneous wireless communication systems according to an embodiment of the present invention.

As shown in FIG. 3, the apparatus for performing the method of analyzing interference between heterogeneous wireless communication systems according to the embodiment of the present invention includes a polarized information input unit 30, a parameter input unit 40, an interference analysis unit 50, and an output unit 60.

The polarized information input unit 30 receives polarized information about the transmission antenna of the interference transmitter 21 and the reception antenna of the victim receiver 11 and provides the polarized information to the interference analysis unit 50.

Here, the polarized information input unit 30 may receive an isolation angle between the transmission antenna of the interference transmitter 21 and the reception antenna of the victim receiver 11 as the polarized information and receive polarized pattern information about the interference transmitter 21 and the victim receiver 11 as the polarized information.

The parameter input unit 40 receives interference parameters necessary to analyze interference between the system subject to interference 10 and the interfering system 20 and provides the interference parameters to the interference analysis unit 50.

The interference parameters may include a variety of values necessary to analyze interference, such as the transmit power of a transmitter included in each of the system subject to interference 10 and the interfering system 20, the antenna gains of a transmitter and receiver included therein, and an isolation distance and isolation frequency between the transmitter and the receiver included therein. Proper values may be selected according to an interference analysis method which is performed in the interference analysis unit 50.

The interference analysis unit 50 calculates a Polarized Mismatch Loss Factor (PMLF) based on the polarized information provided by the polarized information input unit 30 and analyzes the interference influence of the interference transmitter 21 on the victim receiver 11 based on the calculated PMLF and the interference parameters provided by the parameter input unit 40.

That is, the interference analysis unit 50 analyzes the interference influence of the interfering system 20 on the system subject to interference 10 by incorporating a loss characteristic according to a polarized mismatch between the system subject to interference 10 and the interfering system 20 into the interference influence.

Here, the interference analysis unit 50 may calculate a target isolation distance and a target isolation frequency between the victim receiver 11 and the interference transmitter 21 which may prevent interference or calculate an interference probability between the victim receiver 11 and the interference transmitter 21 by using the interference parameters and the PMLF. A detailed method in which the interference analysis unit 50 analyzes an interference influence is described later.

The output unit 60 outputs an analysis of the interference calculated by the interference analysis unit 50, and the operation of the output unit 60 is controlled by the interference analysis unit 50.

The output unit 60 may include a display panel (not shown) and display the analysis of the interference on a screen or may include a speaker (not shown) and output the analysis of the interference in the form of voice.

Figure 4:
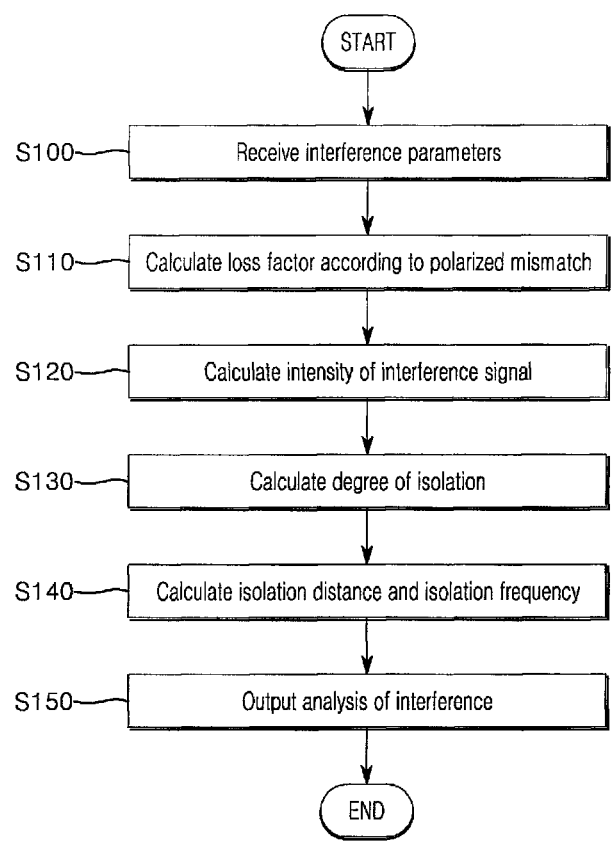
FIG. 4 is a flowchart illustrating an operation of a method of analyzing interference between heterogeneous wireless communication systems according to an embodiment of the present invention.

FIG. 4 is a flowchart illustrating an operation of a method of analyzing interference between heterogeneous wireless communication systems according to an embodiment of the present invention. A method of analyzing an interference influence by incorporating a loss characteristic according to a polarized mismatch into the MCL method is described in detail below with reference to FIG. 4.

First, the interference analysis unit 50 receives interference parameters necessary to analyze interference from the parameter input unit 40 at step S100.

Next, the interference analysis unit 50 receives polarized information about the transmission antenna of the interference transmitter 21 and the reception antenna of the victim receiver 11 from the polarized information input unit 30 and calculates a PMLF between the transmission antenna and the reception antenna at step S110.

Here, the interference analysis unit 50 may calculate the PMLF as in Equation 1 below on the basis of an isolation angle between the transmission antenna of the interference transmitter 21 and the reception antenna of the victim receiver 11.

$$\text{PMLF(dB)} = 20 \log(\cos \theta) \qquad \text{[Equation 1]}$$

In Equation 1, the PMLF indicates a loss factor according to a polarized mismatch between the transmission antenna and the reception antenna, and A indicates the isolation angle between the transmission antenna and the reception antenna.

Next, the interference analysis unit 50 calculates the intensity of an interference signal, radiated from the interference transmitter 21 and then received by the victim receiver 11, on the basis of the PMLF and the interference parameters received from the parameter input unit 40 at step S120.

Here, the interference analysis unit 50 may calculate the intensity of the interference signal as in Equation 2 below.

$$I_{calculated} = P_t + G_t + G_r - L_b(d) - FDR(\Delta f) + \text{PMLF} \qquad \text{[Equation 2]}$$

Here, $P_t$ indicates the transmit power of the interference transmitter 21, $G_t$ indicates the antenna gain of the interference transmitter 21, $G_r$ indicates the antenna gain of the victim receiver 11, $L_b(d)$ indicates a transmission loss according to an isolation distance between the interference transmitter 21 and the victim receiver 11, and $FDR(\Delta f)$ indicates the amount of attenuation according to frequency isolation between the interference transmitter 21 and the victim receiver 11.

Next, the interference analysis unit 50 calculates the degree of isolation by comparing the calculated intensity of the interference signal with a preset acceptable interference value as in Equation 3 at step S130.

Here, the acceptable interference value refers to the intensity of the interference signal which is acceptable to the victim receiver 11, and it may be selected in various ways according to an intention of a designer and parameters regarding the victim receiver 11 and the target transmitter 12.

$$\text{Isolation(dB)} = I_{acceptable} - I_{calculated} \qquad \text{[Equation 3]}$$

In Equation 3, $I_{acceptable}$ indicates the acceptable interference value, and $I_{calculated}$ indicates the intensity of the interference signal which is radiated from the interference transmitter 21 and then received by the victim receiver 11.

Next, the interference analysis unit 50 calculates a target isolation distance and a target isolation frequency on the basis of the calculated degree of isolation at step S140.

Here, the target isolation distance and the target isolation frequency refer to an isolation distance and an isolation frequency between the interference transmitter 11 and the victim receiver 21 which may prevent problems due to interference from occurring. The target isolation distance and the target isolation frequency may be calculated by applying a proper propagation model to the calculated degree of isolation.

Finally, the interference analysis unit 50 may control the output unit 60 so that an analysis of the interference is outputted at step S150. More particularly, the interference analysis unit 50 may control the output unit 60 so that at least one piece of information, from among pieces of information about the degree of isolation, the target isolation distance, and the target isolation frequency, is displayed on a screen or outputted in the form of voice.

Figure 5:
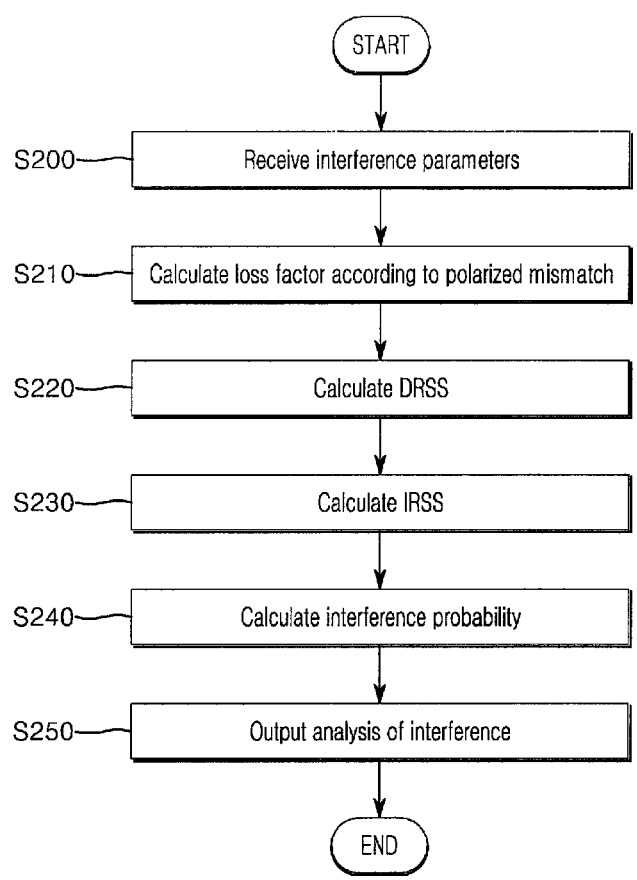
FIG. 5 is a flowchart illustrating an operation of a method of analyzing interference between heterogeneous wireless communication systems according to another embodiment of the present invention.

FIG. 5 is a flowchart illustrating an operation of a method of analyzing interference between heterogeneous wireless communication systems according to another embodiment of the present invention. A method of analyzing an interference influence by incorporating a loss characteristic according to a polarized mismatch into the Monte-Carlo method is described in detail below with reference to FIG. 5.

First, the interference analysis unit 50 receives interference parameters necessary to analyze interference from the parameter input unit 40 at step S200. Here, the interference parameters may include information having a form of a statistically calculated distribution value.

Next, the interference analysis unit 50 receives polarized information about the transmission antenna of the interference transmitter 21 and the reception antenna of the victim receiver 11 from the polarized information input unit 30 and calculates a PMLF between the transmission antenna and the reception antenna at step S210.

Here, the interference analysis unit 50 may calculate the PMLF as in Equation 1 on the basis of an isolation angle between the transmission antenna of the interference transmitter 21 and the reception antenna of the victim receiver 11. The calculation of the PMLF is the same as that described in connection with the previous embodiment, and a detailed description thereof is omitted.

Next, the interference analysis unit 50 calculates the intensity of a normal signal which is radiated from the target transmitter 12 and then received by the victim receiver 11 on the basis of the PMLF and the interference parameters received from the parameter input unit 40 at step S220.

If the intensity of the normal signal radiated from the target transmitter 12 and then received by the victim receiver 11 is defined as a Desired Receiving Signal Strength (DRSS), the DRSS may be calculated according to Equation 4 below.

$$DRSS = P_{wtsupplied} \pm g_{wt \to vr} - pl_{wt \to vr}(f_{vr}) + g_{vr \to wt} + PMLF \quad \text{[Equation 4]}$$

In Equation 4, $P_{wtsupplied}$ indicates power supplied to the target transmitter 12, $g_{wt \to vr}$ indicates an antenna gain directing from the target transmitter 12 to the victim receiver 11, $g_{vr \to wt}$ indicates an antenna gain directing from the victim receiver 11 to the target transmitter 12, and $pl_{wt \to vr}(f_{vr})$ indicates a path loss between the target transmitter 12 and the victim receiver 11.

Next, the interference analysis unit 50 calculates the intensity of an interference signal which is radiated from the interference transmitter 21 and then received by the victim receiver 11 on the basis of the calculated PMLF and the interference parameters received from the parameter input unit 40 at step S230.

Here, the intensity of the interference signal radiated from the interference transmitter 21 and received by the victim receiver 11 may be defined as an Interfering Receiving Signal Strength (IRSS).

Here, interference methods in which interference is performed may chiefly include blocking, unwanted radiation, inter-modulation. IRSSs according to the respective interference methods may be calculated as in Equations 5 to 7 below.

$$IRSS_{block,i} = P_{itsupplied} + g_{itPC} + g_{it \to vr} - pl_{it \to vr}(f_{vr}) - a_{vr} + g_{vr \to it} + PMLF \quad \text{[Equation 5]}$$

Here, $IRSS_{block,i}$ indicates the intensity of a blocking interference signal which is transmitted by an $i^{th}$ interference transmitter 21 and received by the victim receiver 11, $p_{itsupplied}$ indicates power supplied to the interference transmitter 21, $g_{itPC}$ indicates a power control gain for the interference transmitter 21 in a power control function, $g_{it \to vr}$ indicates an antenna gain directing from the interference transmitter 21 to the victim receiver 11, $g_{vr \to it}$ indicates an antenna gain directing from the victim receiver 11 to the interference transmitter 21, $a_{vr}$ indicates blocking attenuation of the victim receiver 11, and $pl_{it \to vr}$ indicates a path loss between the interference transmitter 21 and the victim receiver 11.

$$IRSS_{unwanted,i} = \text{emission}_{it}(f_{it}, f_{vr}) + g_{it \to vr} - pl_{it \to vr}(f_{vr}) + g_{vr \to it} + PMLF \quad \text{[Equation 6]}$$

In Equation 6, $IRSS_{unwanted,i}$ indicates the intensity of an interference signal received by the victim receiver 11 owing to unwanted radiation of an $i^{th}$ interference transmitter 21, and $\text{emission}_{it}(f_{it}, f_{vr})$ indicates the intensity of an interference signal received in the reception bandwidth of the victim receiver 11. In general, the $\text{emission}_{it}(f_{it}, f_{vr})$ may be calculated by using functions, such as a known unwanted radiation mask and the intensity of transmit power of the interference transmitter 21.

$$I_{i,j}RSS_{intermod} = 2*I_iRSS_{int} + I_jRSS_{int} - 3*\text{intermod} - 3\text{sens}_{vr} - 9(dB) + PMLF \quad \text{[Equation 7]}$$

In Equation 7, $I_{i,j}RSS_{intermod}$ indicates the intensity of an inter-modulation interference signal received from an interference transmitter 21 and a $j^{th}$ interference transmitter 21, intermod indicates third inter-modulation attenuation, and $\text{sens}_{vr}$ indicates the sensitivity of the victim receiver 11.

Next, the interference analysis unit 50 calculates an interference probability by comparing a value, obtained by dividing DRSS by the IRSS, with a preset reference value (Carrier-to-Interface (C/I)) as in Equation 8 at step S240.

That is, the interference analysis unit 50 may calculate a probability in which the DRSS/IRSS will become the reference value (C/I) or less as an interference probability on condition that the DRSS is received in a reference reception sensitivity (sens) or higher.

$$P = P\left\{ \frac{DRSS}{IRSS} \leq \frac{C}{I} \,\middle|\, DRSS > sens \right\} \quad \text{[Equation 8]}$$

Finally, the interference analysis unit 50 may control the output unit 60 so that an analysis of the interference is outputted at step S250. More particularly, the interference analysis unit 50 may control the output unit 60 so that the calculated interference probability is displayed on a screen or outputted in the form of voice.

As described above, in accordance with the method of analyzing interference between heterogeneous wireless communication systems according to the present invention, an interference influence between heterogeneous wireless communication systems using different polarized waves can be precisely analyzed by incorporating a loss characteristic according to a polarized mismatch between transmission and reception antennas into the interference influence.

Furthermore, in accordance with the present invention, wireless communication service with high quality can be provided because guard band and technological conditions capable of minimizing interference by precisely analyzing an interference influence between heterogeneous wireless communication systems can be proposed.

Meanwhile, in the present embodiment, an example in which each of the system subject to interference 10 and the interfering system 20 includes a pair of the transmitter and receiver has been illustrated, but the present invention is not limited thereto. The present invention may also be likewise applied to an example in which each wireless communication system includes a plurality of transceivers.

That is, a specific victim receiver 11 may receive a plurality of interference signals from a plurality of the interference transmitters 21, and in this case, the interference analysis methods according to the present invention may also be likewise applied.

Furthermore, in the present embodiment, the methods of incorporating a loss characteristic according to a polarized mismatch into the MCL method and the Monte-Carlo method have been described, but the loss characteristic according to a polarized mismatch may be also applied to various other interference analysis methods.

Furthermore, when analyzing interference between heterogeneous wireless communication systems, an interference influence between heterogeneous wireless communication systems using different polarized waves can be precisely analyzed by incorporating a loss characteristic according to a polarized mismatch between transmission and reception antennas into the interference influence.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method of analyzing interference between heterogeneous wireless communication systems, comprising:
receiving, by an interference analysis unit, interference parameters from a parameter input unit;
receiving, by the interference analysis unit, polarized information from a polarized information input unit and calculating a Polarized Mismatch Loss Factor (PMLF) between a transmission antenna of an interference transmitter and a reception antenna of a victim receiver; and analyzing, by the interference analysis unit, an interference influence of the interference transmitter on the victim receiver based on the interference parameters and the PMLF.

2. The method of claim 1, wherein in the calculating of the PMLF, the interference analysis unit calculates the PMLF based on an isolation angle between the transmission antenna and the reception antenna.

3. The method of claim 2, wherein the PMLF is calculated according to Equation 1 below $$\text{PMLF(dB)} = 20 \log(\cos \theta) \quad \text{(Equation 1)}$$

wherein $\theta$ is the isolation angle between the transmission antenna and the reception antenna.

4. The method of claim 1, wherein in the calculating of the polarized mismatch loss, the polarized information is polarized pattern information about the transmission antenna and the reception antenna.

5. The method of claim 1, wherein analyzing the interference influence comprises:

calculating, by the interference analysis unit, an intensity of an interference signal, radiated from the interference transmitter and received by the victim receiver, based on the interference parameters and the PMLF; and calculating, by the interference analysis unit, calculating a degree of isolation based on the intensity of the interference signal.

6. The method of claim 5, further comprising calculating, by the interference analysis unit, a target isolation distance and a target isolation frequency between the interference transmitter and the victim receiver based on the degree of isolation.

7. The method of claim 5, wherein in the calculating of the intensity of the interference signal, the interference analysis unit calculates the intensity of the interference signal based on one or more of transmit power of the interference transmitter, gains of the transmission antenna and the reception antenna, and an isolation distance and an isolation frequency between the interference transmitter and the victim receiver.

8. The method of claim 1, wherein analyzing the interference influence comprises:

calculating, by the interference analysis unit, an intensity of a normal signal, radiated from a target transmitter and received by the victim receiver, based on the interference parameters and the PMLF;

calculating, by the interference analysis unit, an intensity of a interference signal, radiated from the interference transmitter and received by the victim receiver, based on the interference parameters and the PMLF; and calculating, by the interference analysis unit, an interference probability based on the intensity of the normal signal and the intensity of the interference signal.

9. The method of claim 8, wherein the interference parameters include information having a form of a statistically calculated distribution value.

10. The method of claim 8, wherein in the calculating of the intensity of the normal signal, the interference analysis unit calculates the intensity of the normal signal based on one or more of transmit power of the target transmitter, a gain of a transmission antenna of the target transmitter, a gain of the reception antenna of the victim receiver, and a path loss between the target transmitter and the victim receiver.

11. The method of claim 8, wherein in the calculating of the intensity of the interference signal, the intensity of the interference signal is calculated by applying a blocking interference method.

12. The method of claim 8, wherein in the calculating of the intensity of the interference signal, the intensity of the interference signal is calculated by applying an unwanted radiation interference method.

13. The method of claim 8, wherein in the calculating of the intensity of the interference signal, the intensity of the interference signal is calculated by applying an inter-modulation interference method.

14. The method of claim 8, wherein in the calculating of the interference probability, the interference analysis unit calculates a probability that a value obtained by dividing the intensity of the normal signal by the intensity of the interference signal is a preset reference value or lower, as the interference probability.

\* \* \* \* \*